United States Patent
Yoshizawa (10) Patent No.: US 9,349,081 B2
(45) Date of Patent: May 24, 2016

(54) IMAGE FORMING APPARATUS AND METHOD OF CREATING EVALUATION DATA

(71) Applicant: Konica Minolta, Inc., Tokyo (JP)

(72) Inventor: Masanori Yoshizawa, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/255,503

(22) Filed: Apr. 17, 2014

(65) Prior Publication Data
US 2014/0313552 A1 Oct. 23, 2014

(30) Foreign Application Priority Data
Apr. 22, 2013 (JP) ................................. 2013-089049

(51) Int. Cl.
| | |
|---|---|
| G06K 15/02 | (2006.01) |
| H04N 1/40 | (2006.01) |
| B41J 2/21 | (2006.01) |
| H04N 1/00 | (2006.01) |
| H04N 1/401 | (2006.01) |
| B41J 29/393 | (2006.01) |

(52) U.S. Cl.
CPC ........... *G06K 15/1849* (2013.01); *B41J 2/2142* (2013.01); *G06K 15/027* (2013.01); *H04N 1/0005* (2013.01); *H04N 1/00015* (2013.01); *H04N 1/00042* (2013.01); *H04N 1/00045* (2013.01); *H04N 1/00063* (2013.01); *H04N 1/00068* (2013.01); *H04N 1/00087* (2013.01); *H04N 1/401* (2013.01); *H04N 1/40068* (2013.01); *B41J 2029/3935* (2013.01)

(58) Field of Classification Search
CPC . G06K 15/1849; G06K 15/027; B41J 2/2142; B41J 2029/3935; H04N 1/00015; H04N 1/00042; H04N 1/00045; H04N 1/0005; H04N 1/00063; H04N 1/00068; H04N 1/00087; H04N 1/40068; H04N 1/401
USPC ........... 358/3.24, 1.9, 3.27, 483; 348/E5.091, 348/E7.091; 347/14
See application file for complete search history.

(56) References Cited

U.S. PATENT DOCUMENTS

| | | | | |
|---|---|---|---|---|
| 2003/0067533 A1* | 4/2003 | Omori | ...................... | B41J 2/471 347/248 |
| 2011/0261421 A1* | 10/2011 | Kubozono et al. | ............ | 358/483 |

FOREIGN PATENT DOCUMENTS

| | | | |
|---|---|---|---|
| JP | 06164849 A | * | 6/1994 |
| JP | H06-164849 A | | 6/1994 |
| JP | 06186000 A | * | 7/1994 |
| JP | H06-186000 A | | 7/1994 |
| JP | 2010-087757 A | | 4/2010 |

OTHER PUBLICATIONS

Office Action issued in corresponding Japanese Application No. 2013-089049, mailed Jun. 2, 2015 (8 pages).

* cited by examiner

*Primary Examiner* — Quang N Vo
(74) *Attorney, Agent, or Firm* — Osha Liang LLP (57) ABSTRACT

An image forming apparatus includes an image forming section which forms an image on a sheet, a reading section which reads the image formed on the sheet by the image forming section, and a control section. The control section allows the image forming section to form a reference image for evaluation of image quality, allows the reading section to read the reference image at a resolution lower than a resolution at which the reference image is formed, obtains read values of the reference image, the resolution of which has been made higher than the resolution of the reference image read by the reading section using the read reference image, and creates evaluation data based on the obtained read values.

5 Claims, 9 Drawing Sheets

| | | READING POSITION WITH RESPECT TO MAIN SCANNING DIRECTION | | | | | | | | | |
|---|---|---|---|---|---|---|---|---|---|---|---|
| | | 1st PIXEL | 2nd PIXEL | 3rd PIXEL | 4th PIXEL | 5th PIXEL | 6th PIXEL | 7th PIXEL | 8th PIXEL | 9th PIXEL | 10th PIXEL |
| READING POSITION WITH RESPECT TO SUB-SCANNING DIRECTION | 1st PIXEL | 232.5 | 217.1 | 164.3 | 70.9 | 53.0 | 83.2 | 187.7 | 223.5 | 233.5 | 235.1 |
| | 2nd PIXEL | 229.8 | 216.6 | 169.3 | 76.7 | 54.0 | 78.2 | 186.2 | 227.0 | 233.8 | 233.3 |
| | 3rd PIXEL | 227.6 | 216.3 | 170.8 | 75.9 | 57.6 | 84.7 | 193.0 | 228.0 | 238.3 | 237.3 |
| | 4th PIXEL | 235.1 | 223.6 | 163.5 | 66.9 | 55.9 | 80.7 | 197.8 | 229.0 | 235.8 | 240.5 |
| | ... | ... | ... | ... | ... | ... | ... | ... | ... | ... | ... |
| | nth PIXEL | 231.7 | 216.4 | 159.6 | 68.4 | 54.1 | 84.2 | 193.4 | 224.8 | 235.8 | 238.0 |
| AVERAGE VALUE | | 231.3 | 218.0 | 165.5 | 71.8 | 54.9 | 82.2 | 191.6 | 226.5 | 235.2 | 235.2 |

FIG.8

↓ SMOOTHING

FIG.9

IMAGE FORMING APPARATUS AND METHOD OF CREATING EVALUATION DATA

BACKGROUND OF THE INVENTION

1. Field of the Invention

The present invention relates to an image forming apparatus and a method of creating evaluation data.

2. Description of Related Art

An electrophotographic image forming apparatus forms a reference image on a sheet and reads and analyses the reference image to evaluate image quality for stabilizing image quality.

When a reading section disposed above a sheet conveyance path reads the reference image, high-speed reading of the reference image is expected in connection with the speed-up of image formation.

A method of achieving high-speed reading is to reduce the resolution at the time of reading. Unfortunately, however, if the reference image is read at a resolution lower than the resolution at which the reference image is formed, some evaluation items, such as line reproducibility, are difficult to evaluate accurately if the reference image does not have a high resolution.

A method of obtaining a high-resolution read image using a low-resolution reading section was proposed (see, for example, Japanese Unexamined Patent Application Publication No.6-164849). Specifically, the method obtains a high-resolution image by reading an image while finely shifting its reading position to increase the number of read values for each pixel.

From the same point of view, a method of reading a reference image while tilting the image was also proposed (see, for example, Japanese Unexamined Patent Application Publication No. 6-186000).

Unfortunately, however, in the case of reading an image while shifting its reading position, the frequency of reading is increased. This fails to achieve high-speed reading. In addition, shifting a reading position with high accuracy is difficult, and improper reading positions lead to lower reliability of read values.

In the case of reading a reference image while tilting it, the sheet on which a reference image has been formed needs to be tilted at the time of the reading. Tilting a sheet tends to cause deformation, such as wrinkle and curling, of the sheet. This may reduce the reading accuracy, in fact.

SUMMARY OF THE INVENTION

An object of the present invention is to achieve high-speed reading of a reference image and to create evaluation data which enables accurate evaluation of image quality based on the read reference image.

In order to achieve the above-mentioned object, according to an aspect of a preferred embodiment of the present invention, there is provided an image forming apparatus including: an image forming section which forms an image on a sheet; a reading section which reads the image formed on the sheet by the image forming section; and a control section which allows the image forming section to form a reference image for evaluation of image quality, allows the reading section to read the reference image at a resolution lower than a resolution at which the reference image is formed, obtains read values of the reference image, the resolution of which has been made higher than the resolution of the reference image read by the reading section using the reference image read by the reading section, and creates evaluation data based on the obtained read values.

According to another aspect of a preferred embodiment of the present invention, there is provided a method of creating evaluation data including: forming a reference image for evaluation of image quality on a sheet; reading the reference image on the sheet at a resolution lower than a resolution at which the reference image is formed; obtaining read values of the reference image, the resolution of which has been made higher than the resolution of the read reference image using the read reference image, and creating evaluation data based on the obtained read values.

According to still another aspect of a preferred embodiment of the present invention, there is provided a method of creating evaluation data including: shifting a formation position of a reference image for evaluation of image quality to form a plurality of the reference images at different formation positions on a sheet; reading the reference images on the sheet at a resolution lower than a resolution at which the reference images are formed; combining read values of the read reference images in accordance with shift amounts of the respective reference images, and creating the evaluation data based on the combined read values.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

An image forming apparatus and a method of creating evaluation data of an embodiment of the present invention are described below with reference to the drawings.

Figure 1:
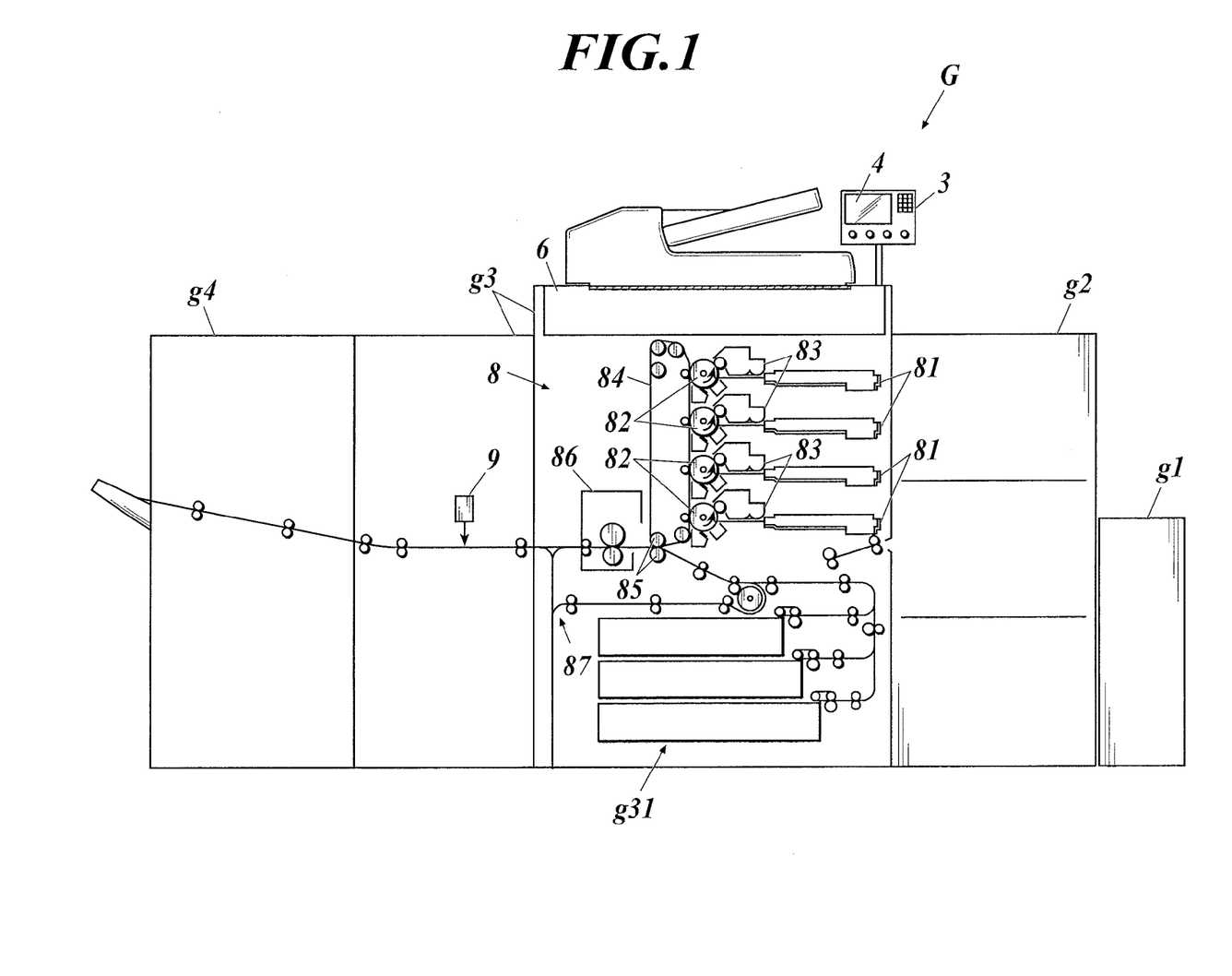
FIG. 1 shows the schematic configuration of an image forming apparatus of the present embodiment.

FIG. 1 shows a schematic configuration of an image forming apparatus G of this embodiment.

As shown in FIG. 1, the image forming apparatus G includes a print controller g1, a sheet feed unit g2, a main body unit g3, and a finisher device g4.

The print controller g1 receives page description language (PDL) data from a computer terminal on the network and rasterizes the PDL data to create image data in the form of bitmap.

The print controller g1 creates image data for each of cyan (C), magenta (M), yellow (Y), and black (K) and outputs the image data to the main body unit g3.

The sheet feed unit g2 includes a plurality of capacious sheet feed trays.

The sheet feed unit g2 feeds a sheet from a sheet feed tray identified by the main body unit g3 to the main body unit g3.

The main body unit g3 includes, for example, an operation section 3, a display section 4, a scanner 6, an image forming section 8, sheet feed trays g31, and a reading section 9.

The main body unit g3 forms an image on a sheet with the image forming section 8 on the basis of the image data obtained by scanning a document with the scanner 6 or the image data created by the print controller g1. The main body unit g3 conveys a sheet on which an image has been formed to the finisher device g4.

The finisher device g4 performs finishing processing on the sheet conveyed from the main body unit g3 and discharges the sheet. The finishing processing includes, for example, stapling, punching, folding, and binding. The finishing processing is not essential but is performed only when the main body unit g3 instructs the finisher device g4 to do so. When the finishing processing is unnecessary, the finisher device g4 discharges the received sheet without performing any processing on the sheet.

Figure 2:
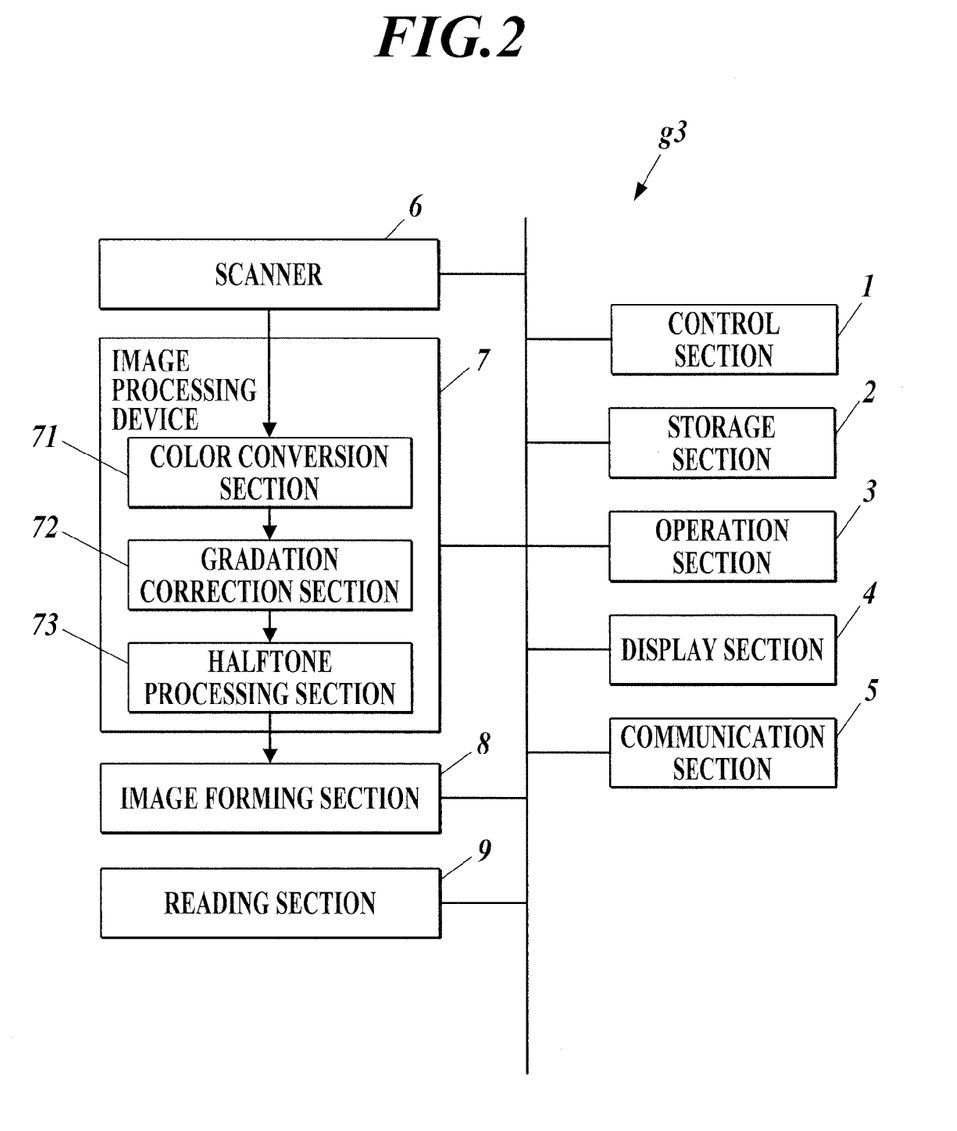
FIG. 2 is a functional block diagram of a main body unit of FIG. 1.

FIG. 2 is a functional block diagram of the main body unit g3.

As shown in FIG. 2, the main body unit g3 includes a control section 1, a storage section 2, the operation section 3, the display section 4, a communication section 5, the scanner 6, an image processing device 7, the image forming section 8, and the reading section 9.

The control section 1 includes, for example, a central processing unit (CPU) and a random access memory (RAM). The control section 1 reads a program contained in the storage section 2 to control each section of the image forming apparatus G in accordance with the program.

The control section 1 allows the sheet feed unit g2 or the sheet feed trays g31 to feed a sheet in accordance with a job setting. The control section 1 allows the image processing device 7 to correct image data and perform image processing on the image data, and allows the image forming section 8 to form an image. When the job setting includes a setting of finishing processing, the control section 1 instructs the finisher device g4 to perform the finishing processing.

The control section 1 can create evaluation data to be used for the evaluation of image quality.

At the time of creating the evaluation data, the control section 1 allows the image forming section 8 to form a reference image for evaluation of image quality and allows the reading section 9 to read the reference image at a resolution lower than the resolution at which the reference image is formed.

The control section 1 obtains, by using the reference image read by the reading section 9, read values of the reference image, the resolution of which has been made higher than the resolution of the reference image read by the reading section 9, and creates evaluation data based on the obtained read values.

The storage section 2 contains, for example, programs and files to be read by the control section 1. A storage medium such as a hard disk and a read only memory (ROM) may be used as the storage section 2.

The storage section 2 contains a reference image to be used for the evaluation of image quality.

The operation section 3 includes, for example, operation keys and/or a touch panel integrated with the display section 4. The operation section 3 receives operations through the keys and/or touch panel and outputs the operation signals corresponding to the operations to the control section 1. A user can input instructions for, for example, setting a job and changing processing through the operation section 3.

The display section 4 may be, for example, a liquid crystal display (LCD). The display section 4 displays, for example, an operation screen in accordance with the instructions from the control section 1.

The communication section 5 communicates with a computer, such as a server or another image forming apparatus, on the network in accordance with the instructions from the control section 1.

The scanner 6 scans an image on a document and creates image data of red (R), green (G), and blue (B) to output the image data for each color to the image processing device 7.

The image processing device 7 corrects image data inputted from the scanner 6 or the print controller g1, performs image processing on the corrected image data, and outputs it to the image forming section 8.

As shown in FIG. 2, the image processing device 7 includes a color conversion section 71, a gradation correction section 72, and a halftone processing section 73.

The color conversion section 71 performs color conversion processing on the RGB image data outputted from the scanner 6, and outputs CMYK image data.

The color conversion section 71 may perform color conversion processing on the CMYK image data outputted from the print controller g1 for color correction and may output the CMYK image data on which the color correction has been performed.

The gradation correction section 72 performs gradation correction processing on the image data outputted from the color conversion section 71 or the print controller g1.

At the time of the gradation correction processing, the gradation correction section 72 uses an LUT in which a correction value is determined for each gradation value in such a way that the gradation characteristics of an image to be formed coincide with the target gradation characteristics. The gradation correction section 72 obtains, from the LUT, the correction values corresponding to the respective gradation values of the pixels of image data and outputs image data constituted of the correction values.

The halftone processing section 73 performs halftone processing on the image data outputted from the gradation correction section 72. The halftone processing includes, for example, screen processing and error diffusion processing using a dithering matrix.

The halftone processing section 73 outputs the image data on which the halftone processing has been performed to the image forming section 8.

The image forming section 8 forms an image on a sheet on the basis of the image data outputted from the image processing device 7.

As shown in FIG. 1, the image forming section 8 includes an exposure part 81, a photoreceptor 82, and a development part 83 for each of the four colors of C, M, Y, and K. The image forming section 8 further includes an intermediate transfer belt 84, secondary transfer rollers 85, a fixing device 86, and a turning-over mechanism 87.

Each exposure part 81 includes a light emitting diode (LED) as a light emitting element. The exposure part 81 drives the LED on the basis of image data. and emits laser light onto the charged photoreceptor 82 for exposure. Each development part 83 supplies toner onto the photoreceptor 82 with a development roller and develops an electrostatic latent image which has been formed on the photoreceptor 82 through the exposure with the toner.

The images formed with the toners of the colors on the four photoreceptors 82 in this way are transferred to the intermediate transfer belt 84 in such a way that the four images are superimposed on one another, and thus a color image is formed on the intermediate transfer belt 84. The intermediate transfer belt 84 is a looped belt stretched over a plurality of rollers and is rotated with the rollers. The secondary transfer rollers 85 transfer the color image on the intermediate transfer belt 84 to a sheet fed from the sheet feed unit g2 or from a sheet feed tray g31. The fixing device 86 applies heat and pressure to the sheet after the transfer to perform fixing on the sheet.

In the case of forming images on both sides of a sheet, the image forming section 8 turns over the sheet with the turning-over mechanism 87 and forms an image on the other side of the sheet. The turning-over mechanism 87 includes a conveyance path to turn over a sheet passing by the mechanism 87. The turning-over mechanism 87 leads the turned-over sheet to the transfer position again at the secondary transfer rollers 85.

The reading section 9 reads an image formed on a sheet by the image forming section 8.

The maximum resolution at which the reading section 9 can read is lower than the maximum resolution at which the image forming section 8 can form an image. The reading section 9 comprises, for example, a color line sensor.

As shown in FIG. 1, the reading section 9 may be disposed downstream of the fixing device 86 on the sheet conveyance path in the conveyance direction.

Figure 3:
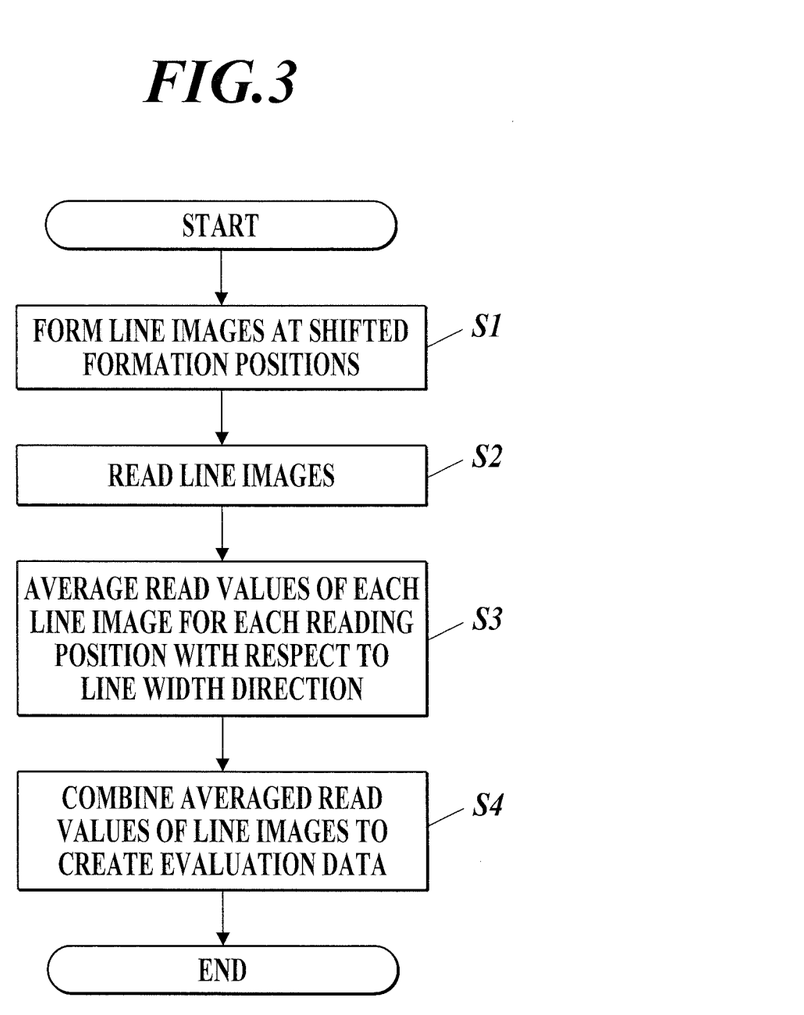
FIG. 3 is a flowchart showing the procedure of creating evaluation data to be executed by the image forming apparatus of this embodiment.

FIG. 3 shows the procedure of creating evaluation data to be performed by the image forming apparatus G.

The evaluation items for evaluating image quality include line reproducibility, the frequency characteristics of an image, and image graininess. Different reference images are used for different evaluation items for creating evaluation data.

The procedure for forming a line image as a reference image and for creating evaluation data for evaluating line reproducibility is described below.

As shown in FIG. 3, the control section 1 of the image forming apparatus G allows the image forming section 8 to shift the formation position of a line image in the line width direction to form a plurality of line images at different formation positions on a sheet (Step S1). The control section 1 allows the reading section 9 to read the line images on the sheet at a resolution lower than the resolution at which the line images are formed (Step S2).

The control section 1 sets the shift amount of each line image to a value smaller than the one-pixel width of the resolution at which the line images are read. When, for example, the line images are formed at the resolution of 1200 dpi and are read at the resolution of 400 dpi, the control section 1 may determine the shift amount in units of one or two pixel(s) of the resolution of 1200 dpi.

Figure 4A:
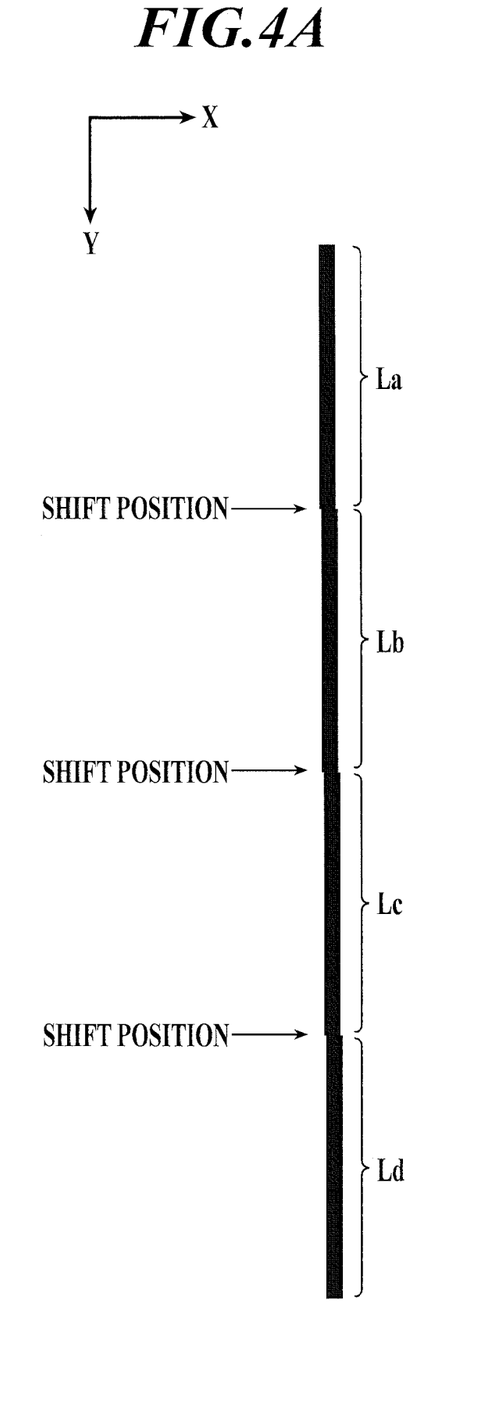
FIG. 4A shows an example of four line images formed by shifting the formation position of a line image as a reference image.

FIG. 4A shows an example of four line images La, Lb, Lc, and Ld, formed by shifting the formation position of a line image.

The line images La to Ld have the same line width and the same gradation value and are vertical lines extending in the sub-scanning direction Y. The line width direction of the line images La to Ld is the main scanning direction X. The line images La to Ld are formed by shifting a line image by a predetermined amount in the line width direction at the shift positions indicated by the arrows, and are formed at the resolution of 1200 dpi.

The line images La to Ld do not necessarily have to be formed continuously as shown in FIG. 4A but may be separated from one another.

Alternatively, the line images may be horizontal lines extending in the main scanning direction X, in which case the line width direction is the sub-scanning direction Y.

Figure 4B:
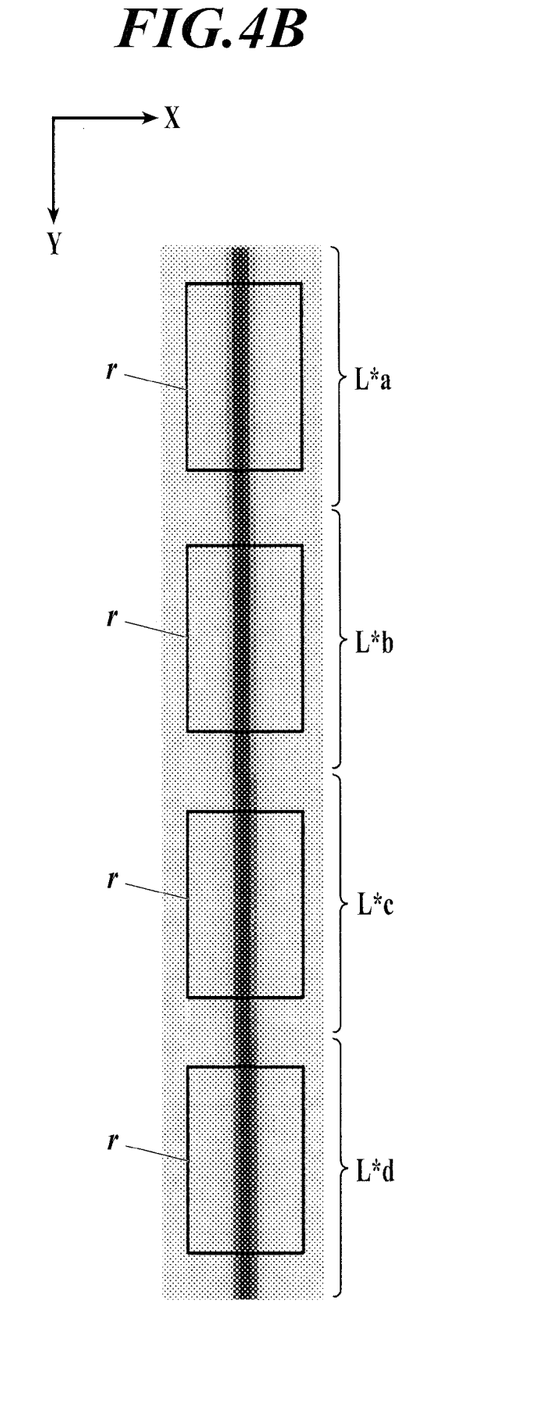
FIG. 4B shows the line images obtained by reading the line images of FIG. 4A.

FIG. 4B shows line images L*a, L*b, L*c, and L*d obtained by reading the line images La, Lb, Lc, and Ld, respectively, of FIG. 4A at the resolution of 400 dpi.

Four read values read at different positions with respect to the shift direction or line width direction are obtained for each pixel of the resolution of 400 dpi from the read line images L*a to L*d.

Figure 5:
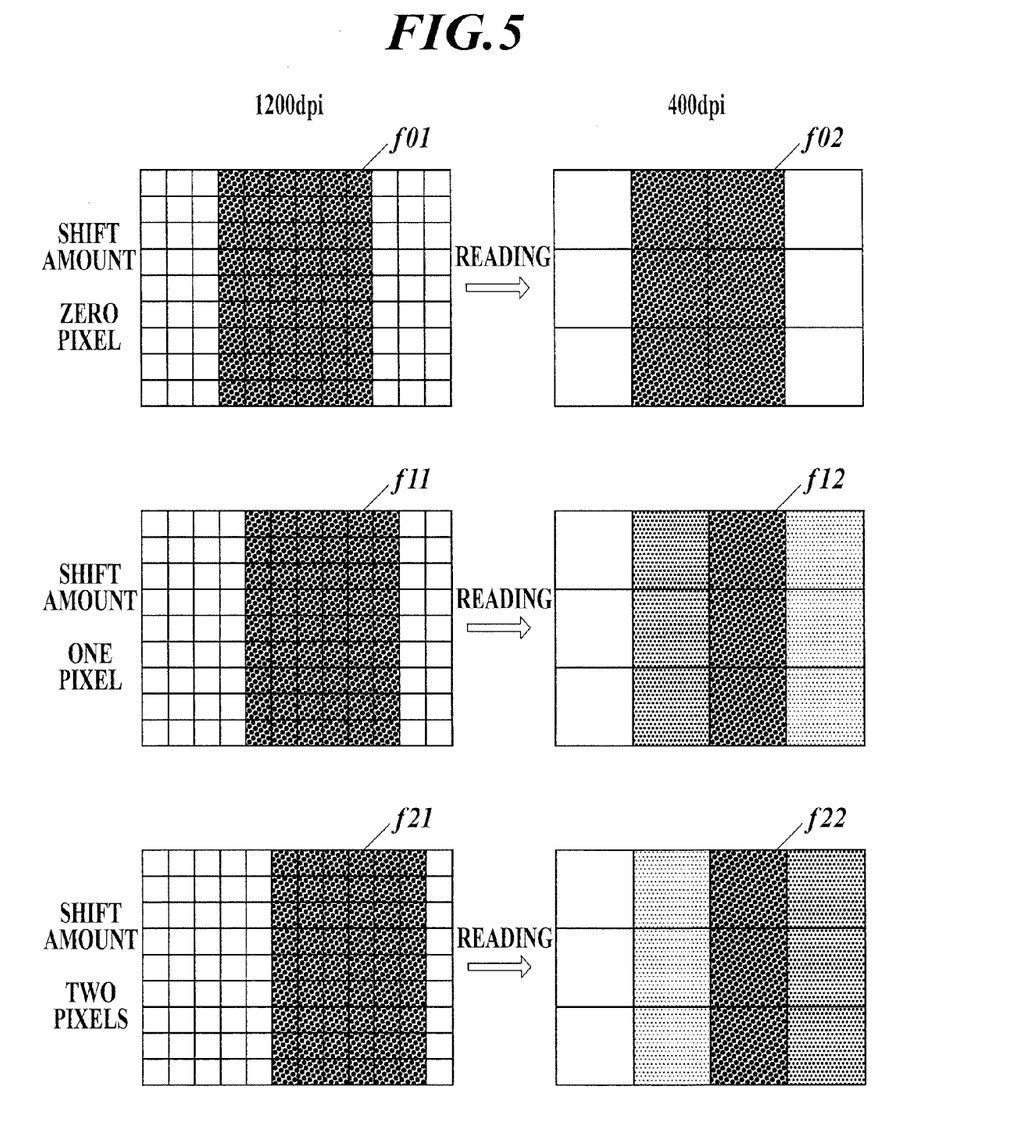
FIG. 5 shows three line images obtained by shifting the formation position of a line image by one pixel each, and line images obtained by reading the three respective line images.

FIG. 5 shows line images f01, f11, and f21 formed by shifting the formation position of a line image by one pixel each at the resolution of 1200 dpi. Each of the line images f01, f11, and f21 has the line width of six pixels and has the gradation value of 100%.

The line images f02, f12, and f22 are line images obtained by reading the line images f01, f11, and f21, respectively, at the resolution of 400 dpi.

The shift amount of the line image f01 is zero pixel, and the line image f02 obtained by reading the line image f01 has the same line width and gradation value as the line image f01.

The formation positions of the line images f11 and f21, which have been shifted, are different from the formation position of the line image f01 by one pixel and two pixels, respectively. The line images f12 and f22 obtained by reading the line images f11 and f21, respectively, thus have a larger line width than the line images f11 and f21, respectively. One end of the line image f12 with respect to the line width direction is reduced in gradation value by one third, and the other end reduced by two thirds; while one end of the line image f22 with respect to the line width direction is reduced in gradation value by two thirds, and the other end reduced by one third.

In this way, when a plurality of images shifted in pixel units of a high resolution are read at a low resolution, a plurality of read values can be obtained for each pixel from the read images as in the case in which an image is read with the reading position being shifted in pixel units of a high resolution. A read image thus seemingly has a high resolution with respect to the shift direction. A line image, which is required to have a high resolution with respect to the line width direction, is shifted in the line width direction. In the case of another evaluation item, a reference image may be shifted to be formed in the direction with respect to which a high resolution is required.

The control section 1 obtains read values in the reading areas r shown in FIG. 4B of the read line images L*a to L*d. The control section 1 averages the obtained read values for each reading position with respect to the line width direction (Step S3).

Since the line reproducibility is largely affected by a luminance component, the control section 1 preferably extracts luminance components from the read values of the line images L*a to L*d and uses the luminance components as read values in the subsequent processing.

If the read values are signal values of R, G, and B, the control section 1 may calculate the luminance component $D_y$ from the signal values $D_R$, $D_G$, and $D_B$ of the R, G, and B, respectively, using the following expression.

$$D_y = 0.299 D_R + 0.587 D_G + 0.114 D_B$$

Figure 6:
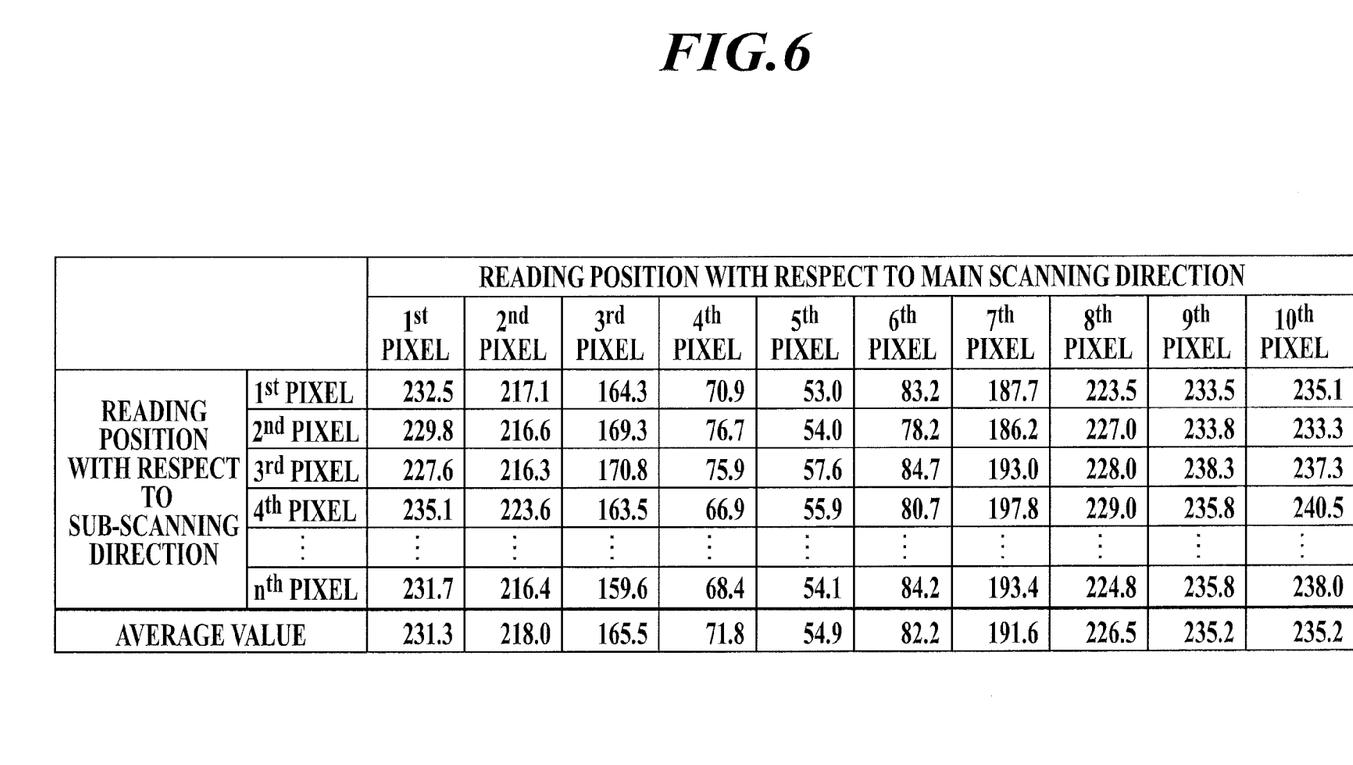
FIG. 6 is a table showing the read values of a line image at the reading positions with respect to the main scanning direction and the sub-scanning direction.

FIG. 6 shows the read values of the line image L*a at the reading positions with respect to the main scanning direction and the sub-scanning direction.

Since the line width direction of the line image L*a is the same as the main scanning direction X, the control section 1 averages the read values of the line image L*a for each reading position with respect to the main scanning direction to obtain average values as shown in FIG. 6. In the same manner, the control section 1 also averages the read values for each reading position with respect to the line width direction for the other line images L*b to L*d.

The control section 1 then combines the averaged read values obtained from the line images L*a to L*d according to the shift amounts of the line images La to Ld. The control section 1 thus creates evaluation data based on the combined read values (Step S4).

Specifically, the control section 1 arranges the averaged read values of the line images L*a to L*d in ascending order of shift amount at the time of the image formation. The control section 1 then combines the arranged read values and obtains evaluation data.

The shift amount at the time of the image formation of the line images L*a to L*d increases in the order of L*a, L*b, L*c, and L*d. The control section 1 thus arranges the averaged read values at the reading positions of the $1^{st}$ to $10^{th}$ pixels with respect to the line width direction of the line images L*a to L*d in the order of the line images L*a, L*b, L*c and L*d. More specifically, the control section 1 arranges the averaged read values in the order of the $1^{st}$ pixel of the line image L*a, the $1^{st}$ pixel of the line image L*b, the $1^{st}$ pixel of the line image L*c, the $1^{St}$ pixel of the line image L*d, the $2^{nd}$ pixel of the line image L*a, the $2^{nd}$ pixel of the line image L*b . . . . The control section 1 then combines the arranged read values.

Figure 7A:
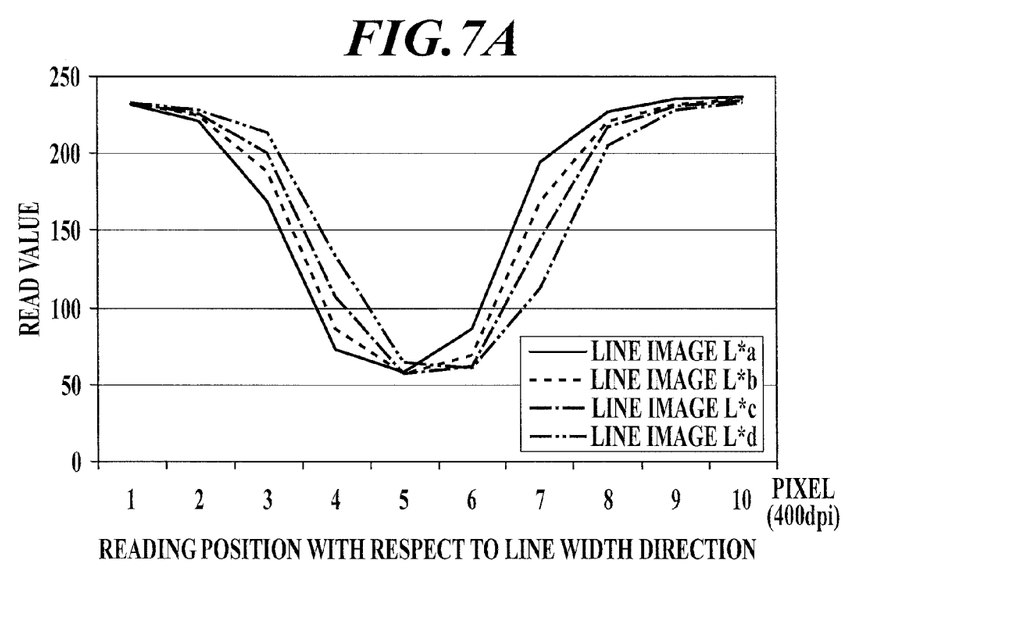
FIG. 7A is a graph showing the intensity distributions of read value of four line images.

When the averaged read values at the respective reading positions with respect to the line width direction are plotted for each of the line images L*a to L*d, the intensity distributions shown in FIG. 7A are obtained.

Since the resolution at which the images are read is low, the read values are discrete values. For this reason, the intensity distributions shown in FIG. 7A are not smooth.

Since line images L*a to L*d have different intensity distributions, it is found that changing a reading position leads to variation in obtained intensity distribution even if the amount of change is smaller than one pixel of the resolution of 400 dpi when using only one of the line images L*a to L*d. Variation in intensity distribution causes variation in evaluation results using the intensity distribution, leading to poor reliability of the evaluation.

In contrast, when the read values of the four line images L*a to L*d are combined, read values at four different reading positions are obtained for each pixel of the resolution of 400 dpi. In other words, the read values of a line image, the resolution of which is increased to 1600 dpi, i.e., four times the resolution of 400 dpi of the line images L*a to L*d, are obtained.

Figure 7B:
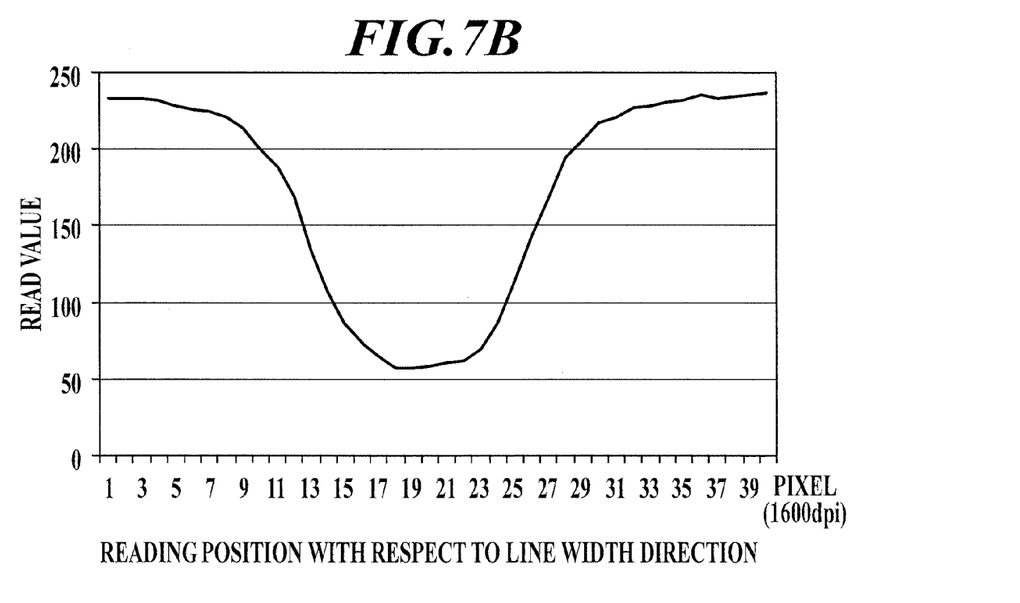
FIG. 7B is a graph showing the intensity distribution of read value of evaluation data.

The intensity distribution shown in FIG. 7B is obtained from the evaluation data created based on the combined read values. As shown in FIG. 7B, the intensity distribution of the evaluation data is smoother than the intensity distributions of the line images L*a to L*d shown in FIG. 7A. When the line reproducibility is evaluated, the line width is determined based on the intensity distribution of the evaluation data. Determining the line width using such a smoother intensity distribution in this way leads to accurate measurement of the line width.

The control section 1 may also smooth the combined read values to create evaluation data.

Examples of the smoothing include performing moving average processing on the combined read values.

Figure 8:
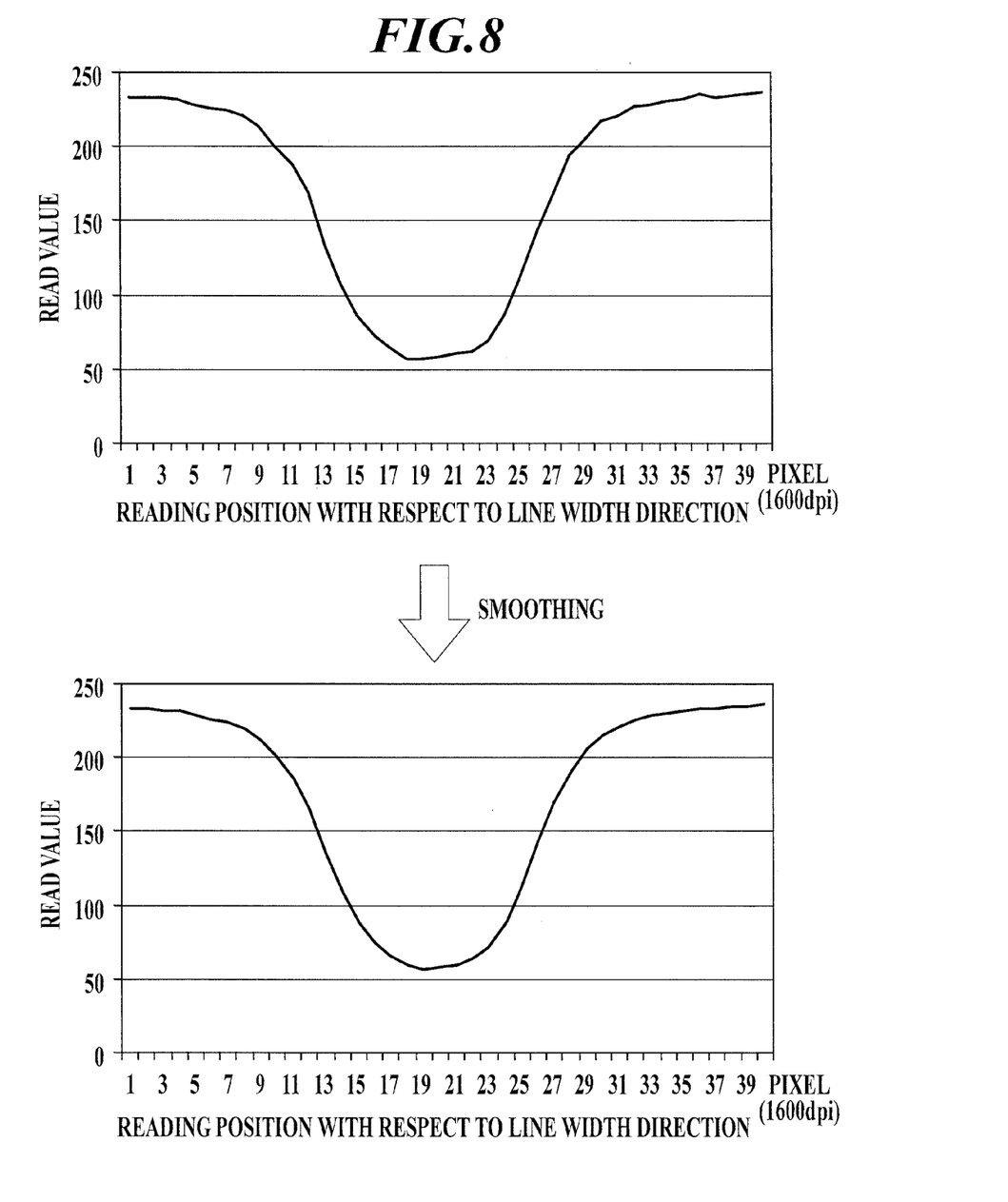
FIG. 8 is a graph showing the intensity distributions of read value before and after smoothing.

The intensity distribution constituted of the combined read values shown in FIG. 7B is denoised through the smoothing as shown in FIG. 8 to be a smoother intensity distribution.

The control section 1 analyzes the created evaluation data and can evaluate the line reproducibility.

Figure 9:
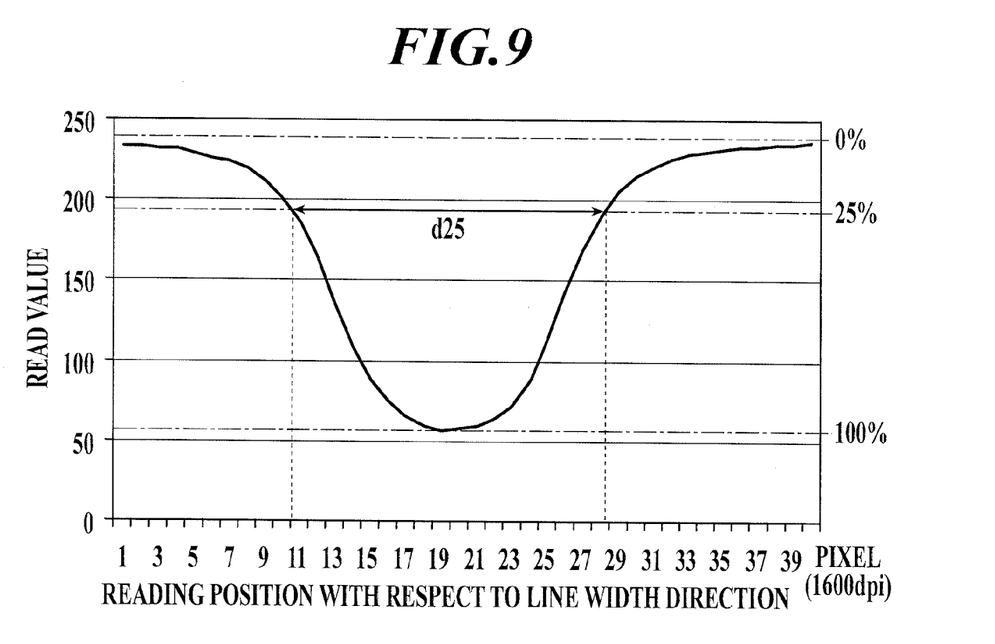
FIG. 9 is a graph showing a line width determined by analyzing evaluation data.

As shown in FIG. 9, for example, in the intensity distribution of the evaluation data, the control section 1 obtains two read values having the intensity of 25%, with the maximum and minimum intensities of the read value being 0% and 100%, respectively; and can determine the distance between the reading positions of the read values as the line width d25. The degree of thickening of the line width can be evaluated by comparing the line width d25 with the reference value of the line width of the line images La to Ld.

As described above, the image forming apparatus G of the present embodiment includes the image forming section 8 which forms an image on a sheet; the reading section 9 which reads the image formed on the sheet by the image forming section 8; and the control section 1 which allows the image forming section 8 to form a reference image for evaluation of image quality, allows the reading section 9 to read the reference image at a resolution lower than the resolution at which the reference image is formed, obtains the read values of the reference image, the resolution of which has been made higher than the resolution of the reference image read by the reading section 9 by using the reference image read by the reading section 9, and creates evaluation data based on the obtained read values.

Further, the reference image is a line image. The control section 1 allows the image forming section 8 to shift the formation position of the line image in the line width direction to form a plurality of line images at different formation positions, arranges read values of the line images in accordance with the shift amounts of the respective line images, combines the arranged read values, and creates evaluation data based on the combined read values.

The resolution at which the reference image is read is lower than the resolution at which the reference image is formed, achieving high-speed reading of the reference image. Further, the evaluation data is created based on the read values of the reference image, the resolution of which has been made higher than the resolution of the read reference image. Such evaluation data enables more accurate evaluation of image quality.

[Other Embodiment]

An image forming apparatus of another embodiment forms one reference image using an image forming section, performs an interpolation operation on the read values of the reference image read by a reading section, obtains the read values of the reference image, the resolution of which has been made higher than the resolution of the read reference image, and creates evaluation data based on the obtained read values. Common interpolation operations, such as a bicubic method, a spline interpolation, and a polynomial interpolation, may be used as the interpolation operation.

The image forming apparatus of this embodiment can be achieved by modifying the procedure of the above-described image forming apparatus G.

A control section 1 allows an image forming section 8 to form a line image La shown in FIG. 4A at the resolution of 1200 dpi and allows a reading section 9 to read the line image La at the resolution of 400 dpi, for example. The control section 1 averages the read values of the read line image L*a for each of the reading positions with respect to the line width direction, and performs the interpolation operation on the averaged read values to insert three read values to each interval between the read values. In this way, read values of the line image, the resolution of which is increased to 1600 dpi with respect to the line width direction, are obtained. The control section 1 combines the read values obtained through the insertion and creates evaluation data based on the combined read values. Additionally, as described above, the combined read values may be smoothed for the creation of evaluation data.

The embodiments described above are merely preferred examples of the present invention, which is not limited to the embodiments. The embodiments may be modified as appropriate within the scope without departing from the spirit of the present invention.

For example, as a computer readable medium for the program to be executed by the control section 1, a non-volatile memory such as a read-only memory (ROM) and a flash memory or a portable storage medium such as a compact disc read only memory (CD-ROM) may be used. Additionally a carrier wave may also be applied as a medium to provide the data of the program via a communication line.

The entire disclosure of Japanese Patent Application No. 2013-089049 filed on Apr. 22, 2013 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image forming apparatus comprising:
an image forming section which forms an image on a sheet;
a reading section which reads the image formed on the sheet by the image forming section; and
a control section which
allows the image forming section to form a reference image for evaluation of image quality,
allows the reading section to read the reference image at a resolution lower than a resolution at which the reference image is formed,
obtains read values of the reference image, the resolution of which has been made higher than the resolution of the reference image read by the reading section using the reference image read by the reading section,
allows the image forming section to shift a formation position of the reference image to form a plurality of the reference images at different formation positions,
combines the read values of the reference images read by the reading section in accordance with shift amounts of the respective reference images,
allows the image forming section to shift a formation position of the reference image in a shifting amount smaller than a one-pixel width of the resolution at which the reading section reads the reference image,
averages the read values of the reference images read by the reading section when the formation position of the reference image is the same,
arranges the averaged read values in an order of the shift amount,
combines the arranged read values, and
creates the evaluation data based on the combined read values.

2. The image forming apparatus according to claim 1, wherein the reference image is a line image; and
the control section
allows the image forming section to shift the formation position of the line image in a line width direction of the line image to form a plurality of the line images at different formation positions,
arranges the read values of the line images in accordance with the shift amounts of the respective line images,
combines the arranged read values, and
creates the evaluation data based on the combined read values.

3. The image forming apparatus according to claim 1, wherein the control section smooths the combined read values to create the evaluation data.

4. A method of creating evaluation data, the method comprising:
forming a reference image for evaluation of image quality on a sheet;
reading the reference image on the sheet at a resolution lower than a resolution at which the reference image is formed;
obtaining read values of the reference image, the resolution of which has been made higher than the resolution of the read reference image using the read reference image;
shifting a formation position of the reference image to form a plurality of the reference images at different formation positions,
combining the read values of the reference images in accordance with shift amounts of the respective reference images.
shifting a formation position of the reference image in a shifting amount smaller than a one-pixel width of the resolution of the reference image,
averaging the read values of the reference images when the formation position of the reference image is the same,
arranging the averaged read values in an order of the shift amount,
combining the arranged read values, and
creating the evaluation data based on the combined read values.

5. A method of creating evaluation data, the method comprising:
shifting a formation position of a reference image for evaluation of image quality to form a plurality of the reference images at different formation positions on a sheet;
reading the reference images on the sheet at a resolution lower than a resolution at which the reference images are formed;
combining read values of the read reference images in accordance with shift amounts of the respective reference images, and creating the evaluation data based on the combined read values,
shifting a formation position of the reference image in a shifting amount smaller than a one-pixel width of the resolution of the reference image,
averaging the read values of the reference images when the formation position of the reference image is the same, arranging the averaged read values in an order of the shift amount,
combining the arranged read values, and
creating the evaluation data based on the combined read values.

* * * * *